United States Patent [19]

Trimble

[11] Patent Number: 4,513,986
[45] Date of Patent: Apr. 30, 1985

[54] BICYCLE FRAME

[76] Inventor: James L. Trimble, 8628 Emerald Rd., Anchorage, Ak. 99502

[21] Appl. No.: 508,880

[22] Filed: Jun. 28, 1983

[51] Int. Cl.³ .......................... B62K 3/02; B62K 19/02
[52] U.S. Cl. ............................................... 280/281 R
[58] Field of Search ............... 280/281 R, 281 B, 288, 280/261

[56] References Cited

U.S. PATENT DOCUMENTS

| | | | |
|---|---|---|---|
| 2,182,828 | 12/1939 | Stutsman et al. | 280/281 R |
| 2,827,306 | 3/1958 | Roder | 280/281 R |
| 3,233,916 | 2/1966 | Bowden | 280/281 R |
| 3,375,024 | 3/1968 | Bowden | 280/281 R |
| 3,884,521 | 5/1975 | Moore | 296/31 P |

FOREIGN PATENT DOCUMENTS

| | | | |
|---|---|---|---|
| 950982 | 10/1956 | Fed. Rep. of Germany | 280/281 R |
| 2455141 | 7/1975 | Fed. Rep. of Germany | 280/281 R |
| 3568 | of 1894 | United Kingdom | 280/281 R |
| 902 | of 1898 | United Kingdom | 280/281 R |
| 303619 | 1/1929 | United Kingdom | 280/281 R |
| 1361394 | 7/1974 | United Kingdom | 280/281 R |

*Primary Examiner*—John A. Pekar

[57] ABSTRACT

A bicycle frame where the structural support is provided by a formed, stressed skin in conjunction with integral tubes and stiffening ribs. A body is formed which joins front fork, pedal axle, seat post and rear wheel axle. The body is visually solid from the side—the two open triangles of a conventional tube frame being filled in, and is airfoil shaped from the top. The body has an integral rear fender where the rear wheel penetrates the rear triangle, and assymetrical rear forks in place of conventional rear frame stays. All control cables, and a cargo compartment, are contained within the frame.

5 Claims, 16 Drawing Figures

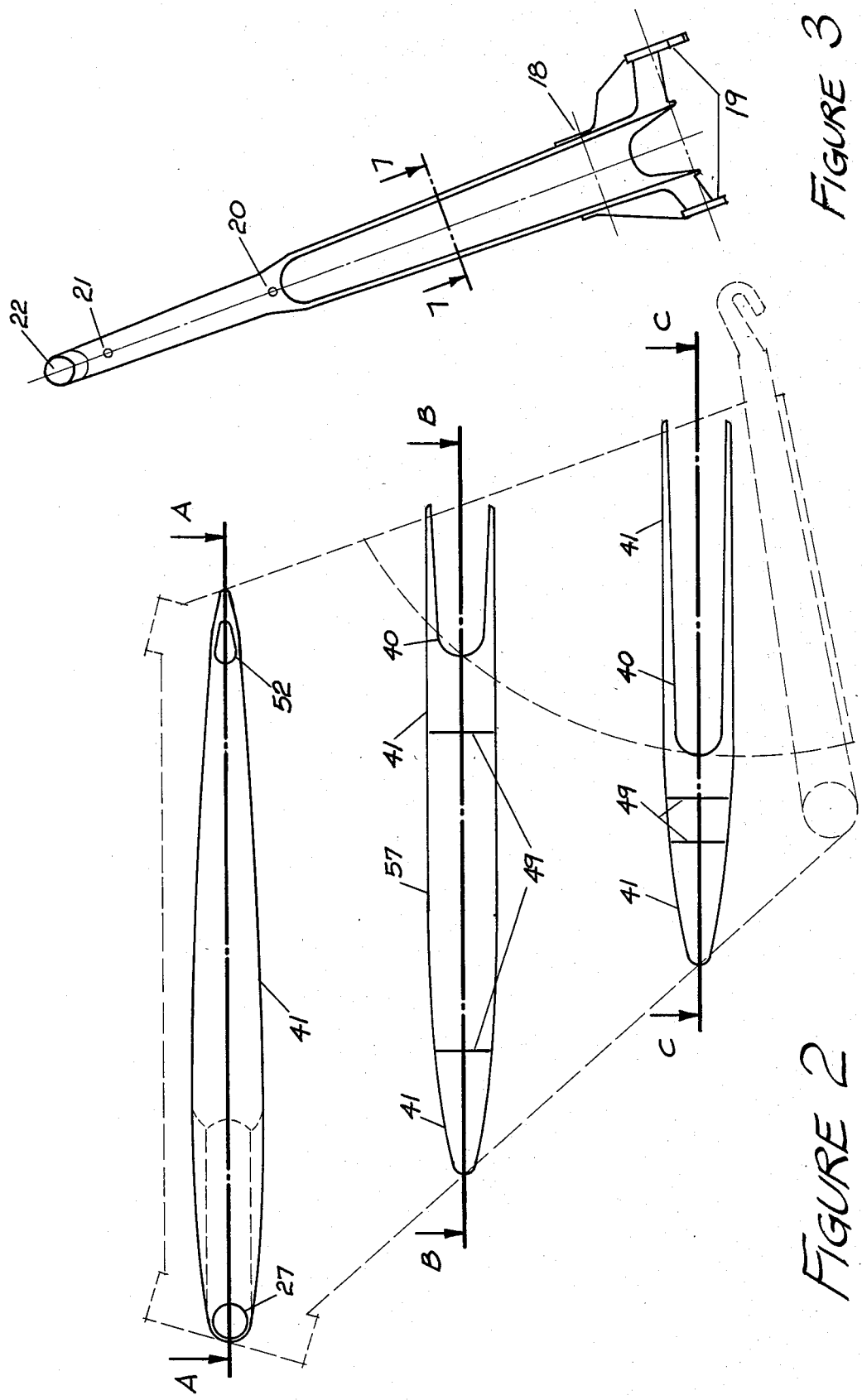

BICYCLE FRAME

FIELD OF THE INVENTION

The present invention is intended as an improvement on existing high performance bicycles, both conventional tubular framed and unitized panel framed. The frame incorporates new and unique features which bring improvements in rigidity, ride, streamlining, servicability, weight reduction, and appearance.

SUMMARY OF THE INVENTION

A monocoque bicycle frame where the structural support is provided by a stressed skin, in conjunction with internal stiffening ribs. A body is formed which joins the front fork, pedal axle, seat post, and rear wheel.

The body is visually solid from the side—the two open triangles of a conventional tube frame being filled in, and is airfoil shaped from the top. The body has an integral rear fender where the rear wheel penetrates the rear triangle, and rear forks in place of conventional rear frame stays. All control cables, and a water bladder, are contained within the frame. Internal stiffening is accomplished with blocks at the rear forks' ends and bottom bracket, shear webs or rigid foam forming "D" section tubes between steering column and seat post, and steering column and pedal axle, and reinforcing strips at the rear fork supports.

Design features of the frame include:
1. Low weight.
2. High torsional stiffness.
3. Resiliant ride as the result of cantilevered rear fork design:

Support for the rear wheel is provided by fork ends, of any suitable material, with integral forward facing drop out slots and derailleur mount boss, which are mounted into box section, cantilever, rear forks. The top, outer side, and bottom surfaces of the fork are formed integral with the frame body. The inner completing surface of the box is formed in conjunction with the integral rear fender. The rear forks are in the same location as chain stays on a conventional tube frame, and at their forward end encompass the bottom bracket support tube. No seat stays are utilized, as on a conventional frame, vertical support being provided by the integral construction of rear fork and frame body. The sides of the rear body of the frame are kept as close as possible to the rear wheel, with the rear fork flairing in width the required amount for the rear hub axle width. This design eliminates the problem, common on other unitized bicycle frame designs, of the drive chain having to penetrate the frame side wall. The rear forks cantilever approximately 3 inches from the end of the frame body, and are designed to allow clearance for wheel removal, free-wheel, sprockets, and chain line.

The cantilever of the rear fork ends allows a small amount of resiliance, which improves the ride comfort over a conventional tube frame. The elimination of rear seat stays also reduces aerodynamic drag.
4. Low wind resistance as the result of unitized design and aerodynamic shape.
5. Improved rear wheel strength as the result of asymmetrical rear fork design:

Because of the width of 6 and 7 speed freewheel clusters commonly used on rear wheels of modern bicycles, it is necessary for the rear hub flanges to be offset up to 7/16 inch from the center line of the rear axle width. Conventional frames are built with symmetrical rear chain stays. This results in an unbalanced or "dished" wheel, which has much more tension on the sprocket side spokes, in order to pull the rim into a centered position over the rear axle. The rear fork of the monocoque bicycle frame is constructed with an offset to the center line of the frame, of the amount required to compensate for the offset of the rear hub flanges, thereby allowing the rear rim to be perfectly centered over the rear hub flanges. This results in balanced spoke tension on each side of the wheel and a stronger wheel.
6. Internal waterbladder and cargo compartment for tools, spare tire, food, etc.
7. Improved high speed stability as the result of frame side area causing a fin effect and generating positive aerodynamic stability.
8. Improved visibility resulting from greater surface area.

BRIEF DESCRIPTION OF THE DRAWINGS

FIG. 2 is three horizontal sectional views of the frame in FIG. 1, showing frame profile at different locations.

FIG. 3 is a rear elevation view of the bicycle frame in FIG. 1. Componentry is omitted for clarity.

DETAILED DESCRIPTION

Figure 1:
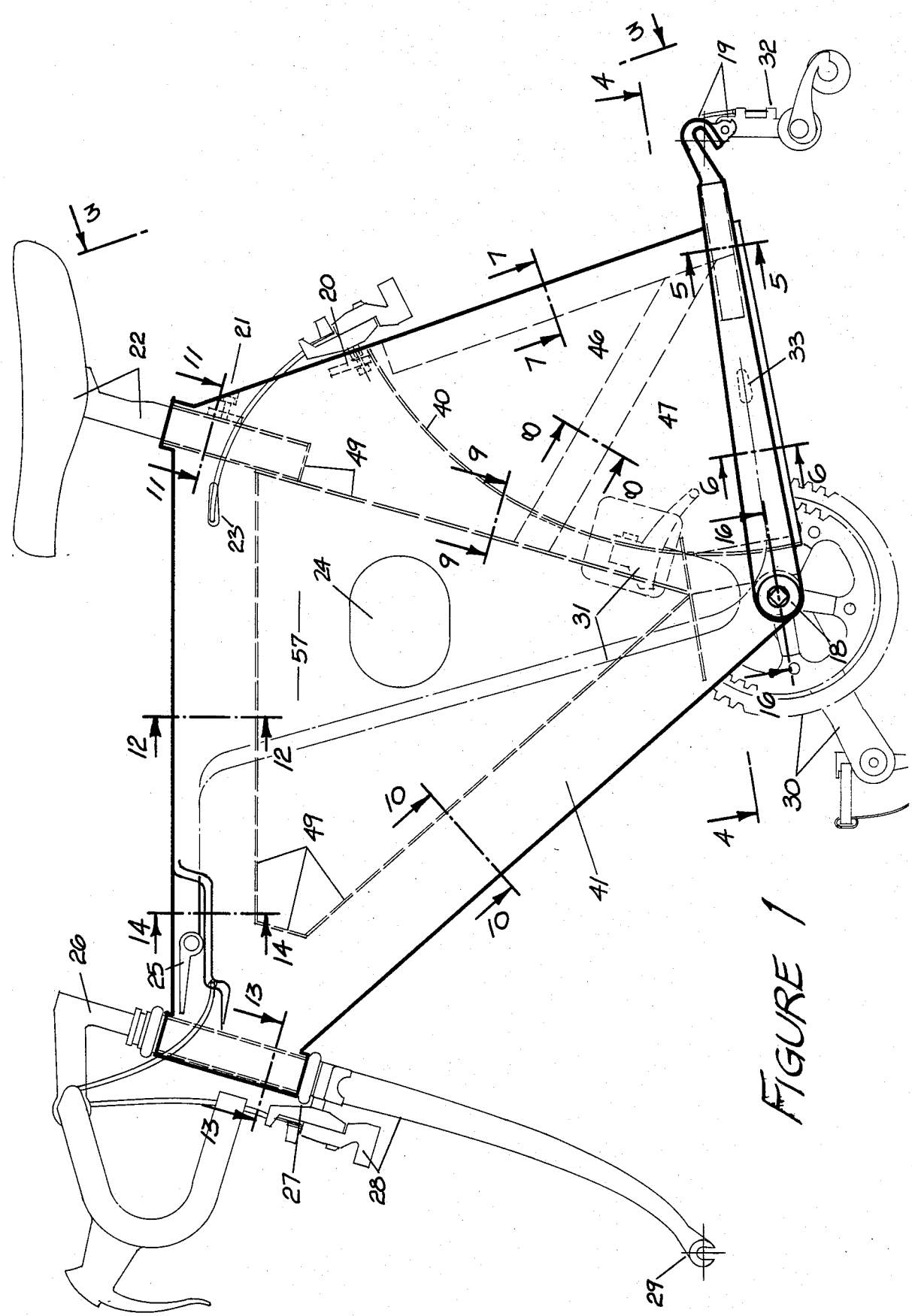
FIG. 1 is a side elevation view of a bicycle frame according to the invention. Wheels being conventional in art are omitted for clarity.
Figure 6:
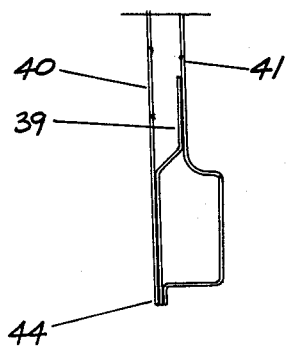
FIG. 6 is a sectional view of one side of the rear fork assembly in FIG. 4, indicating the tubular construction of the fork.
Figure 5:
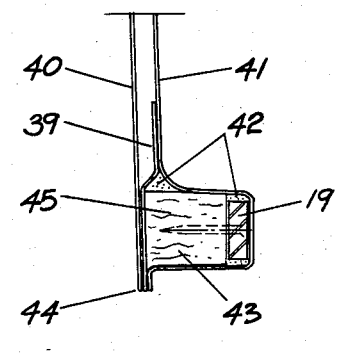
FIG. 5 is a sectional view of one side of the rear fork assembly in FIG. 4, at the fork end attachment.
Figure 14:
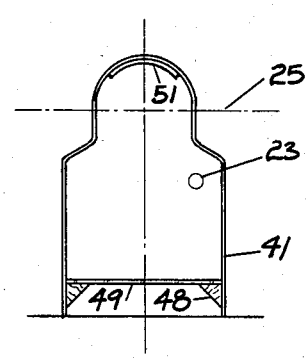
FIG. 14 is a sectional view of the upper "D" section connecting frame member, at the shift lever recesses, of the bicycle frame in FIG. 1.
Figure 12:
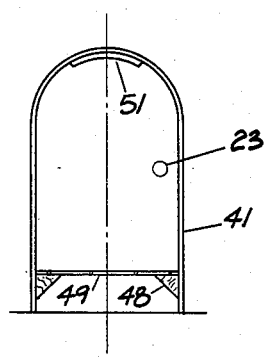
FIG. 12 is a sectional view of the upper "D" sectional connecting frame member of the bicycle frame in FIG. 1.
Figure 10:
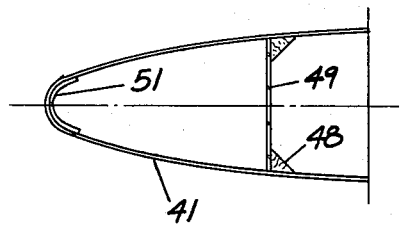
FIG. 10 is a sectional view of the lower "D" section connecting frame member of the bicycle frame in FIG. 1.

A bicycle frame constructed in accordance with this invention is illustrated in FIG. 1. The basic components of the frame include the stressed skin frame shell, indicated by items 41 and 57, with integral rear fender 40, and various internal stiffening shear webs, strips and blocks, indicated by items 46, 47, 49, 54, 55, and 56. The frame shell may be formed of any suitable stiff, lightweight material. Fiber reinforced plastic, of the many available types and resin combinations, is suitable, as is light weight sheet metal. In the case of fiber reinforced plastic, the thickness and direction of fiber can be optimized in relation to the stresses experienced at a particular location. For instance, the side walls of the box section rear fork, FIG. 6, are more highly stressed than the filler panels 57, and therefore can be formed several layers thicker. The frame shell is most practically manufactured in three pieces, a right and left half shell, and a one piece rear fender. The pieces can be joined by any suitable means, mechanically or adhesively. An integral joining tape 51, is illustrated in FIGS. 12 and 14 as an example. The shear webs, strips and blocks 46, 47, 49, 54, 55, and 56 can be formed of any suitable material such as aircraft plywood, fiber reinforced plastic, spruce or balsa wood, sheet metal, or rigid foam. The "D" section tubes, FIGS. 10 and 12, provide the main structural support of the upper frame, with the integral filler panels, item 57, FIGS. 1 and 2, providing additional bracing and streamlining. The box section rear fork tubes, FIGS. 5 and 6, provide the main structural support of the rear wheel axle, with additional vertical and torsional support provided by strips 46 and 47 and reinforcing block 55.

Figure 13:
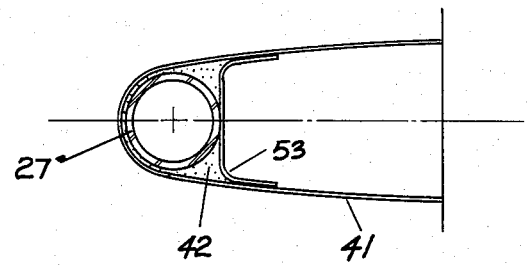
FIG. 13 is a sectional view of the steering support column of the bicycle frame in FIG. 1.

The frame includes a tubular steering support column, FIG. 13, which supports a conventional front fork and brake assembly 28, headset bearings 27, and handle bar and stem assembly 26. The tube is of any suitable material, and is adhesively secured with a hardening putty 42, and any suitable reinforcing material 53, within the frame shell 41.

A recess is formed in the frame shell, FIG. 14, to accommodate gear shift levers 25. Shift cables are routed internally to appropriate shift mechanisms.

A tubular "D" shaped connecting member, FIG. 12, is formed between steering column and seat post by the addition of a shear web 49, and triangular reinforcing 48, between the frame shells 41. A suitable joining material 51, joins the frame shells which are most practically formed in halves. Rigid expanding plastic foam may be used, filling the "D" tube, in lieu of, or in conjunction with, shear web 49.

A recessed exit for the rear brake cable 23 is provided. The cable runs internally within the frame tube, FIG. 12.

Figure 11:
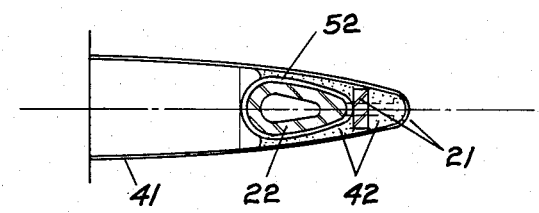
FIG. 11 is a sectional view of the seat post support and securing system of the bicycle frame in FIG. 1.

A tubular seat support column, FIG. 11, which supports a seat post and seat 22, is adhesively secured between frame shells 41, with a hardening putty 42. The support column 52, is formed or molded of any suitable material for a sliding fit around seat post 22. Seat post is of existing art, and may be oval as illustrated, or circular. A locking set screw and nut 21, are provided to secure seat post at desired height. The bottom end of support column 52 rests on, and is joined to, a shear web 49, extending between sides of frame shell 41.

A rear brake of conventional art is secured with a bolt to a reinforcing plate of any suitable material 21, adhesively secured within frame shells with hardening putty 42.

Figure 7:
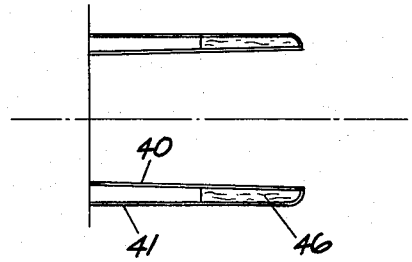
FIG. 7 is a sectional view of the rear fork supports of the bicycle frame in FIG. 1.

A strip of any suitable reinforcing material 46, is adhesively secured between frame shell 41, and rear fender 40, to provide stiffening for rear fork supports, FIG. 7.

Figure 8:
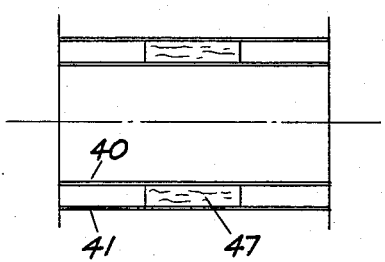
FIG. 8 is a sectional view of the diagonal stiffening strips at the rear fork of the bicycle frame in FIG. 1.

A diagonal strip of any suitable reinforcing material 47, is adhesively secured between frame shell 41 and rear fender 40, FIG. 8, to provide additional support for rear fork.

Figure 9:
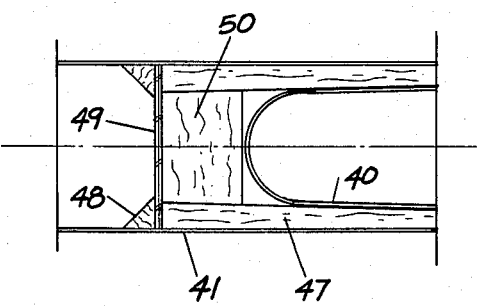
FIG. 9 is a sectional view of the vertical shear web, stiffening strips of FIG. 8, and the integral rear fender of the bicycle frame in FIG. 1.

FIG. 9 illustrates a shear web 49, and reinforcing angles 48, which connect seat support column 52, and pedal axle reinforcing block 55. FIG. 9 also illustrates the termination of reinforcing strips 47 and their joining block 50.

An access hatch 24, is provided within filler panels 57, for access to cargo compartment formed within frame by shear webs 49.

A tubular "D" shaped connecting member, FIG. 10, is formed between steering column and pedal axle as described for FIG. 12.

A front derailleur assembly 31, is set in a recessed pocket formed in frame shell 41, and secured with screws to a reinforcing plate of any suitable material adhesively applied to frame shell 41. Control cables to this and rear derailleur are contained within frame.

Figure 16:
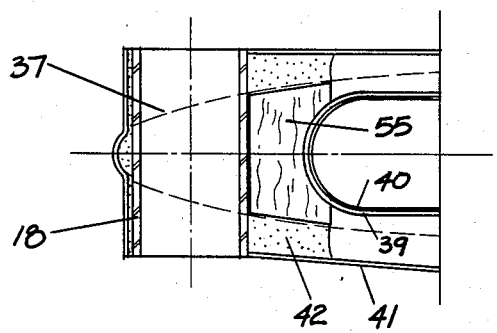
FIG. 16 is a horizontal sectional view of the pedal axle support tube and associated reinforcing of the bicycle frame in FIG. 1.
Figure 15:
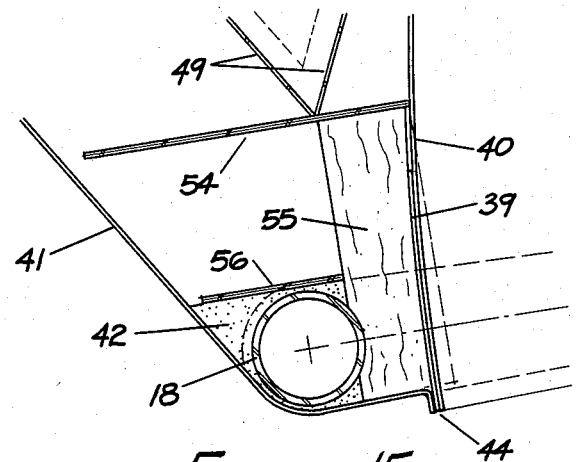
FIG. 15 is a vertical sectional view of the pedal axle support tube and associated reinforcing of the bicycle frame in FIG. 1.

A tubular pedal axle support column 18, FIGS. 15 and 16, supports a conventional bottom bracket assembly and crankset 36. The tube is of any suitable material, and is adhesively secured with hardening putty 42, and reinforced with shear webs 54 and 56, and pedal axle reinforcing block 55.

Figure 4:
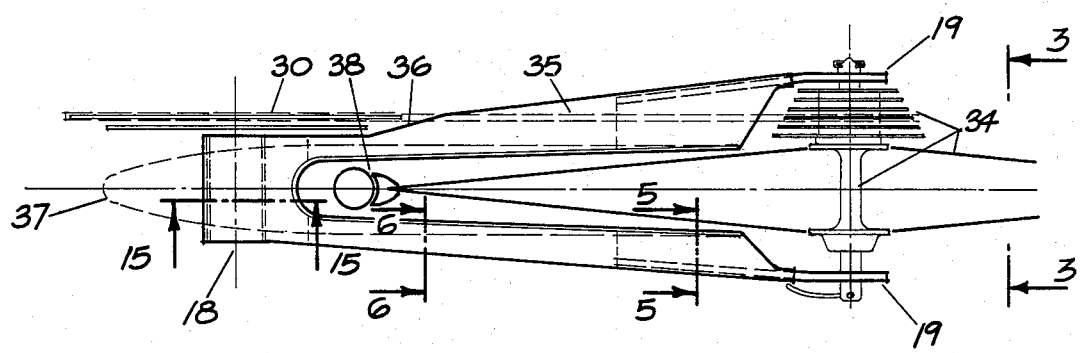
FIG. 4 is a plan view of the rear fork assembly, taken in section directly above the fork, of the bicycle frame in FIG. 1.

A tubular rear fork, illustrated in plan in FIG. 4, connects pedal axle with rear wheel axle. The rear fork can be asymmetrically positioned with respect to frame center line, best seen in FIGS. 3 and 4, to eliminate the necessity of dishing multispeed rear wheel hubs 34, thereby eliminating uneven spoke tension in the wheel assembly. FIG. 5 is a section view through one side of the rear fork at the attachment point for cantilevered rear fork ends 19. The fork ends can be constructed of any suitable material and are formed with integral wheel drop-out slots and rear derailleur mount boss. The fork ends are secured within the tubular fork with hardening putty 42, reinforcing block or spacer of any suitable material 43, and mechanical fasteners 45. An inner completing surface 39, of comparable material and thickness, is attached to frame shell 41, before installation of rear fender 40, thus forming a box section tube of great rigidity. FIG. 6 illustrates the configuration of the fork tube at a station closer to the pedal axle. The drive side fork tube is indented, FIG. 4, item 36, to provide clearance for chainwheel assembly 30. A typical chainline is indicated by 35. The profile of the upper frame body is indicated by 37, the tire/rim assembly by 38. The exit point for the rear derailleur shift cable is indicated on FIG. 1 by item 33, the rear derailleur, conventional in art, by 32.

What is claimed is:

1. A bicycle frame comprising, in combination, a tubular steering support column formed to rotatably support a handle bar stem and front fork and wheel assembly; a tubular seat support column formed to support a seat post and seat assembly; a tubular pedal axle support column formed to rotatably support a pedal crank and chainwheel assembly; cantilever rear fork blades formed to support a rear wheel assembly, the frame having the form of (1) an exterior structural skin surface, connected to and extending between said columns and rear fork blades in such a manner that the perimeter edges of said skin define the outline of the frame's geometry from the side view and an airfoil section with a blunt edge at the steering support column, and a sharp edge at the seat support column, and lower rear sides adjacent to the portion of the rear wheel assembly which penetrates the frame's geometry arranged in spaced apart substantially, parallel configuration positioned as closely as possible to the rear wheel assembly, from the plan view, (2) an internal arcuate fender, formed of structural skin, which encloses the portion of the rear wheel assembly which penetrates the frame's geometry, and fits within lower rear sides of said exterior structural skin, and internal reinforcing means which, in combination with said structural skin, form structural members including, (3) tubular members connecting the steering support column and seat support column, and the steering support column and pedal axle support column formed by the addition of an elongate web member secured in a substantially perpendicular manner between opposing interior surfaces, and parallel to the perimeter edge of said structural skin, (4) spaced apart, diverging, tubular members connecting the pedal axle column and cantilever rear fork blades, so arranged as to allow external routing of rear wheel drive chain and external placement of rear wheel drive sprocket(s) and shifting mechanism, formed by an integral outward extension of the lower edge of said exterior structural skin forming top, outside, and bottom surfaces secured to a separately formed inner surface by flanges at the top and bottom, completing a substantially rectangular tube section provided with the pedal axle column and rear fork blade support means at respective ends; (5) elongate reinforcing strips connecting rear, inner ends of said tubular rear fork support members with said seat support column, and at an intermediate position roughly bisecting said rear fender, with a seat support web and connecting member, said reinforcing strips filling a void space between said exterior structural skin and said internal structural skin of fender, (6) an elongate web member connecting seat support column and pedal axle support column secured in a substantially perpendicular manner between opposing inner surfaces of said structural skin, and (7) a web member secured in a substantially perpendicular manner between opposing inner surfaces of said structural skin, placed above and parallel to a line connecting the pedal axle column and rear wheel axle, and connected to the pedal axle support column by a vertical connecting member.

2. A bicycle frame according to claim 1 wherein said structural skin surfaces are constructed of any suitable moldable or formable material or combination of materials.

3. A bicycle frame according to claim 1 wherein said tubular connecting members are filled with a rigid expanded foam or honeycomb core.

4. A bicycle frame according to claim 1 wherein perimeter edges of said exterior structural skin, which define the frame's geometry, are arranged in other than straight line configuration between perimeter points in the side view and airfoil configuration in the top view.

5. A bicycle frame according to claim 1 wherein said spaced apart tubular members connecting the pedal axle column and cantilever rear fork blades are offset horizontally from the longitudinal frame centerline a required amount to place a rear wheel hub flange assembly's centerline on the longitudinal frame centerline.

* * * * *